Jan. 11, 1927. 1,613,837

F. J. LAHER

AUTOMOBILE BUMPER

Filed Feb. 23, 1926

INVENTOR
Frank J. Laher
BY White Prost
his ATTORNEYS

Patented Jan. 11, 1927.

1,613,837

UNITED STATES PATENT OFFICE.

FRANK J. LAHER, OF OAKLAND, CALIFORNIA.

AUTOMOBILE BUMPER.

Application filed February 23, 1926. Serial No. 90,006.

This invention relates generally to bumpers for automobiles or other vehicles.

The ordinary automobile bumper comprises an impact member in the form of one or more horizontal bars which are mounted in operative position by means of one or more support members. It must have sufficient strength to withstand severe impact forces and at the same time must have sufficient resilience or "give" to absorb the energy of such impacts. In case an impact is concentrated near the center of the bumper, the impact bars are apt to be permanently bent inwardly unless they are reinforced at this point or are made of excessively heavy material. This is especially true of a bumper in which the supporting means comprises two separate members which are not interconnected.

It is an object of this invention to devise a bumper which will withstand heavy impacts concentrated near the center of the same.

It is a further object of this invention to devise a bumper which will withstand and absorb heavy impact forces but which can be made of relatively light material and is therefore cheap to manufacture.

Further objects of this invention will appear from the following description in which the preferred embodiments of the invention have been set forth.

Referring to the drawings.

Figure 1:
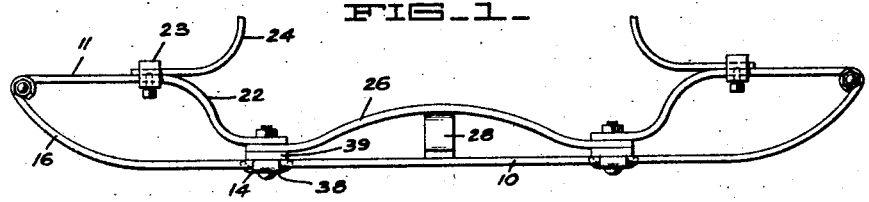
Figure 1 is a plan view showing one form of the invention.

The device comprises generally an impact member 10 having connected thereto a pair of support bars 11. The impact member is preferably constructed of a plurality of vertically spaced impact bars which are retained in spaced relationship by suitable means such as anchoring clamps 14. In the bumper shown in Fig. 1 each end of the impact member is formed with a rearwardly curved portion 16 and corresponding ends of the bars 12 and 13 have formed on their ends the eyes 17 and 18. The outer end of each support bar 11 has formed thereon an eye 19 adapted to register with the eyes 17 and 18 to receive a pin or bolt 20 which pivotally connects together the impact member to the support members. The inner end of each support bar 11 has a forwardly extending portion 22 having its end connected to one of the clamps 14, the clamps 14 being located at spaced points intermediate the ends of the impact member. A pair of clamps 23 serve to secure the support bars to the brackets 24 which in turn are secured to the frame of an automobile, thus retaining the bumper in operative position.

Figure 8:
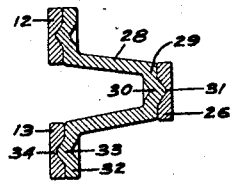
Fig. 8 is a detail cross sectional view taken along the line 8—8 of Fig. 2.
Figure 9:
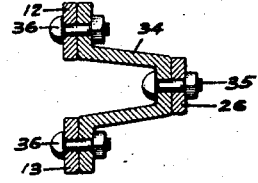
Fig. 9 is a view similar to Fig. 8 but showing a modified form of spacer.

To strengthen the device against impacts there is provided a truss element or bar 26 located rearwardly of the central portion of the impact member and which is placed under tension to resist inward bending of the impact bars 12 and 13. The truss bar 26 has its ends anchored to the impact bars 12 and 13 preferably by means of the anchor clamps 14 and has its intermediate portion bent rearwardly and spaced from the impact bars. A rigid spacer 28 is also inserted between the central portion of the truss bar 26 and the impact bars 12 and 13. In Fig. 8 one form of separator is shown which comprises a U-shaped member 28 having a head 29 which is provided with a pressed-out projection 30 adapted to engage in an indentation 31 in the bar 26. The extremities 32 are similarly provided with pressed-out projections 33 which engage indentations 34 in the impact bars 12 and 13. With this construction the separator is retained in position without resorting to bolts or other special fastening devices. In the construction shown in Fig. 9 the separator comprises a U-shaped member 34 which is somewhat similar to the U-shaped member 28 but which is retained in position by means of a bolt 35 extending through the truss bar 26 and bolts 36 which secure the extremities of the U-shaped member to the impact bars 12 and 13.

Figure 4:
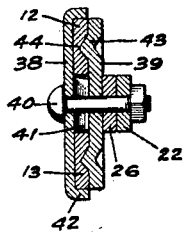
Fig. 4 is a sectional view taken along the line 4—4 of Fig. 3.
Figure 5:
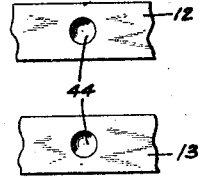
Fig. 5 is a detail view showing the indentations on the impact bars for engaging the anchoring clamps.
Figure 6:
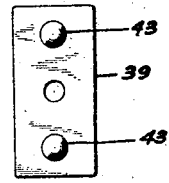
Fig. 6 is a detail view of one of the clamping plates of the anchoring clamps shown in Fig. 4.
Figure 7:
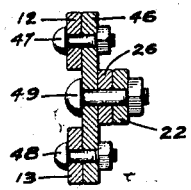
Fig. 7 is a cross sectional view showing a modified form of anchoring clamps.

Since the compressional stresses against the truss bar may be relatively great, it is necessary to employ a special form of anchoring clamps 14 to prevent relative movement between the ends of the bar 26 and the impact member. One form of clamp which may be employed is illustrated in Fig. 4 and comprises front and rear clamping plates 38 and 39 which are secured together by means of the clamping bolt 40, this bolt also preferably serving to secure the end of the truss bar 26 and the inturned portion 22 to the anchoring clamps. The plate 38 is provided with a central spacer 41 and lugs 42 which serve to engage and retain the impact bars 12 and 13 in spaced relationship. The clamping plate 39 interlocks the impact bars by means of the pressed-out projections 43 which extend into indentations 44 in the impact bars thus effectively insuring against displacement of the anchoring clamps. A modified form of anchoring clamps is shown in Fig. 7 in which a single plate 46 is bolted to the impact bars by means of bolts 47 and 48 and has its central portion secured to bars 22 and 26 by means of a central bolt 49.

When the bumper described above receives an evenly distributed forward impact the bar portion 22 will be placed under compression and will buckle a certain amount, thus allowing the bumper to "give" and absorb the energy of the impact. If a concentrated impact is received tending to bend the central portion of the impact member inwardly, the truss bar 26 will be placed under tension and the central portion of the impact bars 12 and 13 between the anchoring clamps 14 will be placed under compression. The interlocking nature of the anchoring clamps 14 makes it possible for them to withstand the strain imposed by the tensioned stresses in the truss bar 26.

Figure 2:
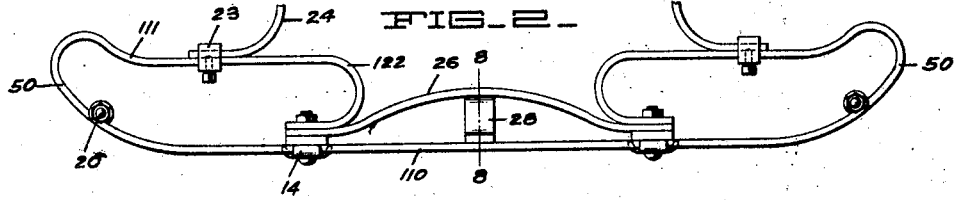
Fig. 2 is a plan view showing a modification of the invention.
Figure 3:
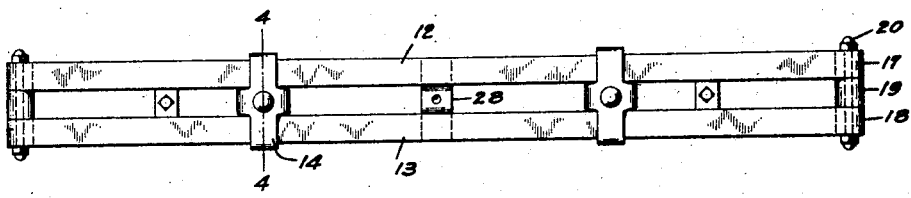
Fig. 3 is a front view of the bumper shown in Fig. 1.

In the modification of the invention shown in Fig. 2 the support bars 111 each have their outer ends formed with an open loop 50, the extremity of which is pivotally secured to the impact member 110 by means of pin 20. The inner end of each support bar is provided with an inner looped portion 122 which extends forwardly and has its extremity secured to the anchoring clamps 14. The truss bar 26 and separator 27 function the same in this modification as in the construction previously described. However, the nature of the loops 50 and 122 permits more "give" to the impact members.

As the impact bars of this bumper are reinforced by members which resist impact forces principally by compressional and tensional stresses, these reinforcing members may be made of relatively light material. Furthermore the use of the truss bar 26 makes it possible for the bumper to withstand impacts concentrated near the center of the same even though the impact bars 12 and 13 may be of relatively light construction.

I claim:

1. An automobile bumper comprising impact and support members forming open looped ends, means for reinforcing the intermediate portion of the impact member comprising a member having its ends anchored to the impact member at spaced intermediate points and spaced rearward of the central portion of the impact member and adapted to resist inward flexing of the same by tensional stresses, and a separator interposed between said last named member and the impact member.

2. An automobile bumper comprising an impact member, a pair of spaced support bars adapted to be mounted on an automobile, the outer ends of said bars being secured to corresponding ends of said impact member, the inner ends of said bars being bent forwardly and secured to the impact member at spaced intermediate points, and a truss member connecting said points and adapted to resist bending of that portion of the impact member between said points.

3. An automobile bumper comprising an impact member, a pair of spaced support bars adapted to be mounted on an automobile, the outer ends of said bars being secured to corresponding ends of said impact member, the inner ends of said bars being bent forwardly and secured to the impact member at spaced intermediate points, and a truss bar having its ends anchored to the impact member at said points and having its central portion bent rearwardly.

4. An automobile bumper comprising an impact member, a pair of spaced support bars adapted to be mounted on an automobile, the outer ends of said bars being secured to corresponding ends of said impact member, the inner ends of said bars being bent forwardly and secured to the impact member at spaced intermediate points, a truss bar having its ends anchored to the impact member at said points and having its central portion bent rearwardly, and a spacer positioned between the central portion of the truss bar and the impact member.

5. An automobile bumper comprising an impact member, a pair of spaced support bars adapted to be mounted on an automobile, the outer ends of said bars being secured to corresponding ends of said impact member, the inner ends of said bars being bent forwardly adjacent the impact member, a pair of clamps anchored to said impact member at spaced intermediate points, means for anchoring the inner ends of said support bars to said clamps, and a truss bar having its ends anchored to said clamps, said truss bar having its central portion bent rearwardly.

6. An automobile bumper comprising impact and support members, said support members comprising a pair of bars having open looped ends pivotally secured to the impact member, said support bars being extended inwardly and secured to said impact member.

7. An automobile bumper comprising impact and support members forming open looped ends, means for reinforcing the impact member at spaced intermediate portions, and means for reinforcing the central portion of the impact member.

In testimony whereof, I have hereunto set my hand.

FRANK J. LAHER.